Figure 1:
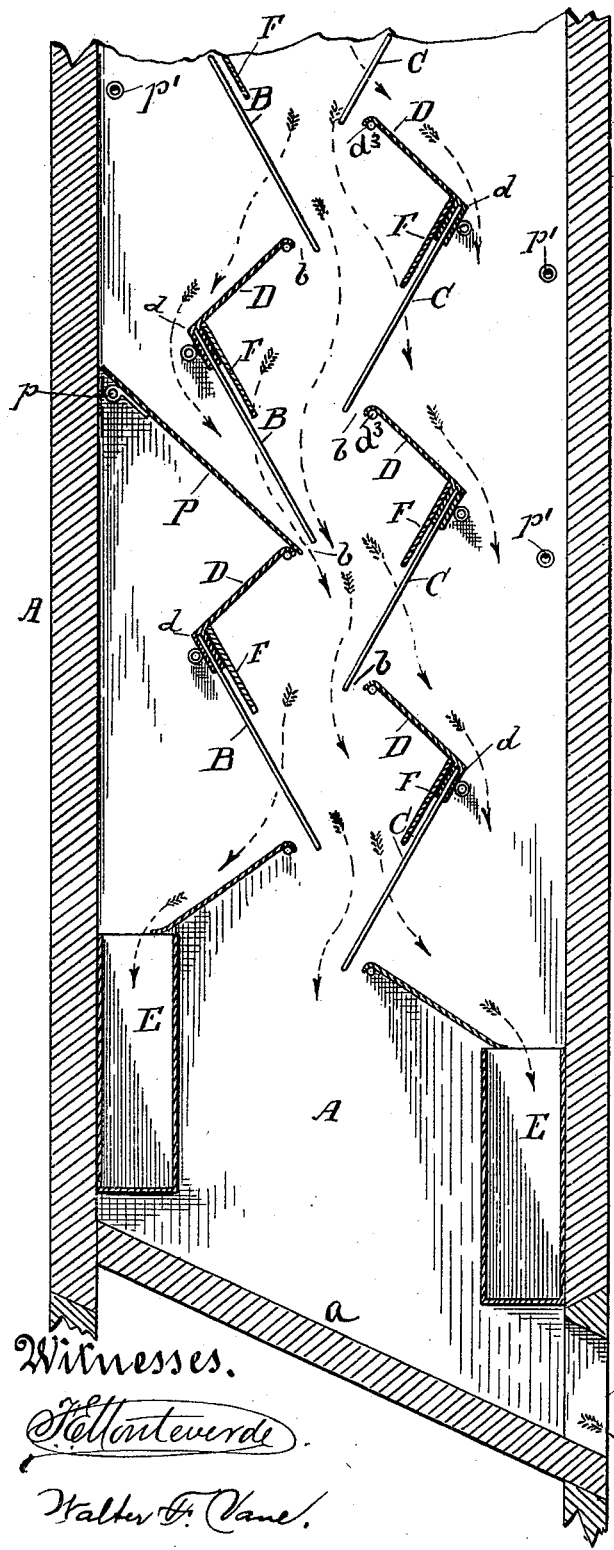

No. 639,855. Patented Dec. 26, 1899.
R. W. JESSUP.
SEPARATOR.
(Application filed Aug. 18, 1898.)

(No Model.) 2 Sheets—Sheet 1.

Witnesses.

Inventor.
Robert W. Jessup,
by Wm. F. Booth,
his Attorney.

THE NORRIS PETERS CO., PHOTO-LITHO., WASHINGTON, D. C.

No. 639,855. Patented Dec. 26, 1899.
R. W. JESSUP.
SEPARATOR.
(Application filed Aug. 18, 1898.)

(No Model.) 2 Sheets—Sheet 2.

Witnesses
Albert Popkins.
Chas. W. Parker

Inventor
Robert W. Jessup.
By Wm. F. Booth
Attorney

UNITED STATES PATENT OFFICE.

ROBERT W. JESSUP, OF SAN FRANCISCO, CALIFORNIA, ASSIGNOR OF ONE-HALF TO FAIRFAX H. WHEELAN, OF SAME PLACE.

SEPARATOR.

SPECIFICATION forming part of Letters Patent No. 639,855, dated December 26, 1899.

Application filed August 18, 1898. Serial No. 688,894. (No model.)

*To all whom it may concern:*

Be it known that I, ROBERT W. JESSUP, a citizen of the United States, residing in the city and county of San Francisco, in the State of California, have invented certain new and useful Improvements in Separators; and I do hereby declare the following to be a full, clear, and exact description of the same.

My invention relates to certain improvements in separators used in connection with the separation of barley, wheat, or other cereals, and more particularly to that class of separators in which is employed a series of inclined screens adapted to successively receive the material and separate its particles. In separators of this kind the screens are mounted in a casing or spout the height of which is governed by the capacity of the machine, which is itself dependent upon the number of screens in the series. It is obvious that a greater number of screens will give a more complete separation than a smaller number, or, in other words, the grade of separations is determined by the number of screens in the series.

With the machines now in use the separation of the particles commences the moment the material falls upon the first screen contained within the spout and continues during the downward travel of the material through the length of the spout. If the spout is, say, fourteen feet in height and the screens placed at intervals therein, the screening or separation continues from the top to the bottom of the spout. Consequently, when the material is finally discharged a separation of a single grade is secured. Practical operation has demonstrated that the market requires various grades of separation. Hence to meet such requirements it is necessary as the machines are at present constructed to arrange an independent machine for each grade. For instance, suppose a spout fourteen feet in height, with its arranged screens, gives a separation corresponding to grade No. 1 or the cleanest separation. It follows that such machine is not adapted for the separation of grade No. 2 or No. 3. To secure such grades, it is obvious that a less number of screens must be employed in the fourteen-foot spout for grade No. 2 and a less number for grade No. 3, or an independent separator of less height must be provided for each required grade. In either case this means that the purchaser of a separator for, say, grade No. 3 cannot thereafter use his separator to secure the separation of grade No. 2 or No. 1. Hence a distinct separator is required in order to obtain a separation of each grade of the material.

The object of my invention is to so construct the separator that different desired grades of separation may be secured, thus enabling the owner of a single separator to obtain the various grades of separation without going to the expense of providing a number of separators to perform such work. This result I attain by making a spout of a given length, or such length as is required, with its screens, to secure the finest grade of separation and providing the spout at given intervals with means for the attachment of a cut-off by means of which the downwardly-traveling material is intermingled at such point in order that the separation of the material for the required grade will take place below the point of cut-off.

Accordingly my invention consists in what may be termed a "cut-off plate," adapted to be interposed in the stream of the separated particles or screenings and to turn said stream back again into the main body of the material, thus joining all the particles once more and rendering only that portion of the machine below said cut-off plate effective for final separation, while that portion above is without function.

My invention is applicable to any separator in which a series of screens is used. The character of the screens is immaterial. They may be the ordinary foraminous metal plates, or they may be wire gauze or netting or any other form; but for convenience I will illustrate my improvement in connection with that peculiar screen and arrangement of contiguous parts which I have shown in Letters Patent No. 576,195, dated February 2, 1897, and in subsequent applications, Serial Nos. 649,581 and 657,173, filed August 26, 1897, and November 2, 1897, respectively.

Figure 2:
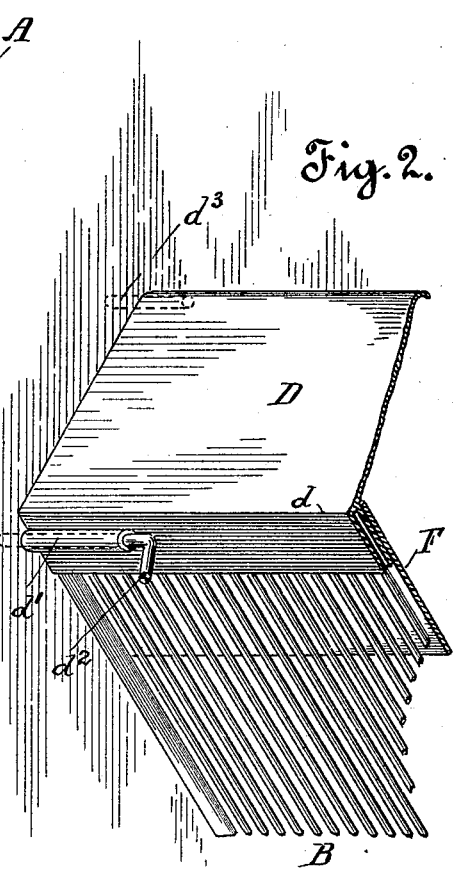
Figure 3:
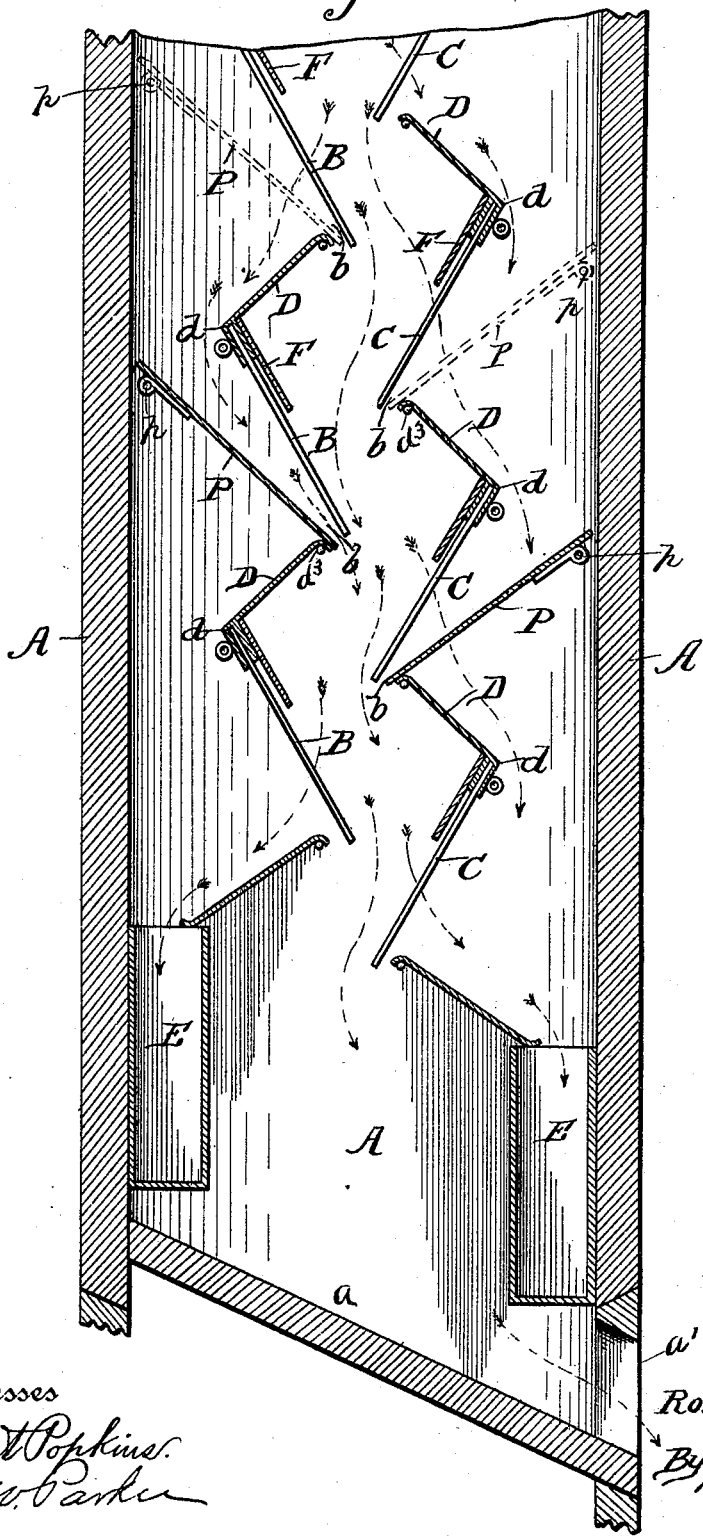

Referring to the accompanying drawings, Figure 1 is a vertical section of a separator, showing the application of the cut-off plate at one side of one of the vertical series of screens. Fig. 2 is a view of the screen which I use in the separator to which my cut-off plate is at present applied. Fig. 3 is a vertical sectional view showing the application of the cut-off at each side of the chute.

A is a box or casing which on account of its general proportions may properly be called a "spout." Within this spout is mounted a series of screens B, with intervening stop-plates D, which approximately bridge the space between the foot of one screen and the head of the succeeding screen. In the present case, however, these stop-plates do not extend fully across this space; but there is left a small or narrow space $b$ between the foot of the screen above and the head of the stop-plate, in which narrow space the delivery edge of my cut-off plate is inserted, as I shall presently explain.

Opposing the series of screens B is a second series, consisting of surfaces the principal function of which, as far as the first series of screens is concerned, is that of directing-plates by which the material is directed upon successive screens of the series B. This is as I illustrated them in my patent above mentioned. Incidentally, however, as far as this case is concerned, said series C are screens, like series B, having stop-plates D, so that the screens of both series have the double function of screens and directing-plates. The screens are constructed, as shown in Fig. 2, of parallel spaced needles of a pliant and springy character, secured fixedly at one end to a common head $d$, and thence extending free and independent to the other end. In practice the stop-plates D are secured to or formed with the heads $d$, and said heads are provided with sockets $d'$, in which are fitted pins $d^2$, which said pins enter sockets in the walls of the spout A, whereby the combined screen and stop-plate is hingedly mounted in the spout, all as I have described in a previous application above referred to. The upper or head end of the stop-plate rests against fixed stops $d^3$ in the spout.

E are boxes or receptacles to receive the particles screened out, said boxes communicating with a suitable passage, and thence to an exterior delivery.

The inclined bottom $a$ of the spout delivers the main stream of clean particles through opening $a'$.

The operation is this: The worthless particles or screenings are sifted out by successive screens and kept apart by the stop-plates D, the stream of said screenings flowing down in the channel back of said screens and plates. The clean particles continue on down all the screens and are delivered separately. This is the general operation of all separators of this kind.

Now it often happens that a grade of separations as would result from the use of all the screens in the machine is not desired, but a grade resulting from a less number of screens may be wanted. To effect this, I interpose in the stream of the separated particles or screenings which flows in the channel back of the screens and stop-plates a cut-off plate P, the lower or delivery end of which enters in the space $b$ between the lower end of a screen and the upper end of a stop-plate. Thus the stream of separated particles or screenings instead of continuing on down to the bottom delivery is diverted and thrown back again into the main stream in the space between the screens, and the whole material is once more together. Therefore all the separation which had taken place up to that point has gone for nothing, and only that portion of the machine below the level of the cut-off plate P is efficient for final separation. Now by placing this cut-off plate at different heights in the spout as many or as few screens may be brought into play as desired for the particular grade of separations required. For example, take a separator fourteen feet long, and by means of a cut-off plate I can use any length of it desired. I can use only the lower ten feet or twelve feet, and so on. The cut-off plate may be mounted in the spout in any suitable manner. I have here shown it as secured upon pins $p$ at its upper end and resting upon the top of the underlying stop-plate D at its lower end. The pins $p$ enter sockets $p'$ in the spout, and in order to illustrate the possibility of mounting the cut-off plate at different heights I have shown sockets $p'$ in the spout-walls at several different levels, so that it may be readily understood that a cut-off plate may be inserted and supported by its pins in any of said sockets.

Though I have shown only one cut-off plate in Fig. 1 of the drawings, I can have another on the other side behind the screen-series C, as shown in Fig. 3 of the drawings. By the use of one or more of these cut-off plates I can call into use only such number of screens as will give me the required grade of separations, and I can use the same machine for all grades desired.

F are guards, protectors, or fenders consisting of a plate over the head of each screen, their object being to prevent stray particles from wedging between the needles, as I have explained in a previous application.

Having thus described my invention, what I claim as new, and desire to secure by Letters Patent, is—

1. In a separator having a series of screens adapted to separate the material, and a suitable channel in which the screenings are kept apart, a cut-off device arranged within said channel, and adapted to intercept the stream of said screenings, and turn it back again into the material, whereby only those screens below the level of the cut-off plate are effective for final separation.

2. In a separator having a series of screens adapted to separate the material, and a suitable channel in which the screenings are kept apart, a cut-off plate adapted to be mounted at different heights in said channel, to intercept the stream of said screenings at any point desired, and turn it back again into the material, whereby only those screens below the level of the cut-off plate are effective for final separation.

3. In a separator having a spout or casing, and a series of screens therein, adapted to separate the material, and so arranged as to form a channel in said spout, to keep the screenings separate, a cut-off plate adapted to be mounted at different heights in the channel which conveys said screenings and to intercept the stream thereof and turn it back again into the material, whereby only those screens below the level of the cut-off plate are effective for final separation.

4. In a separator, the combination of a series of inclined screens, adapted to separate the material, a series of intervening stop-plates, to keep the screenings apart, and a cut-off plate interposed in the stream of screenings, to intercept and turn it back again into the material, whereby only those screens which are below said cut-off plate are effective for final separation.

5. In a separator, the combination of a series of inclined screens, adapted to separate the material, a series of intervening stop-plates, to keep the screenings apart, a cut-off plate interposed in the stream of screenings, to divert and turn it back again into the material, whereby only those screens which are below said cut-off plate are effective for final separation, and means for securing said cut-off plate at different heights, whereby different grades of separations may be had, as required.

6. In a separator, the combination of a series of inclined screens, adapted to separate the material, a series of intervening stop-plates, to keep the screenings apart, a series of inclined directing devices opposing the series of screens, and adapted to direct the material to said screens successively, and a cut-off plate adapted to be set at different heights in the stream of screenings, to divert it back again into the material.

7. In a separator, the combination of a series of inclined screens, a series of stop-plates, each plate extending between the head of one screen and the foot of the one next higher, and terminating short of said higher screen, whereby a space is left between the upper end of the stop-plate and the foot of the screen, and a cut-off plate adapted to be set at different heights, said plate intersecting the space back of the screens and stop-plates, and having its lower end lying in the space between the stop-plate and the screen next higher, whereby the stream of screenings is diverted by said cut-off plate and turned into the material again.

8. In a separator, the combination of a casing or spout, a series of inclined screens mounted therein, a series of stop-plates, each plate extending between the head of one screen and the foot of the one next higher and terminating short of said foot, a series of directing devices opposing the screens and adapted to direct the material from screen to screen successively, a cut-off plate secured in the spout back of the screens and stop-plates, said plate intersecting the space between the spout and the screens, and having its lower end entering the space between the stop-plate and the screen, whereby the screenings are turned back again into the material, and means for securing said cut-off plate in the spout at different heights, whereby different grades of separations may be had.

In witness whereof I have hereunto set my hand.

ROBERT W. JESSUP.

Witnesses:
JAMES L. WHEELER,
CHAS. J. RUSSELL.